April 12, 1966        G. V. COLBY, JR        3,246,241

VARIABLE PHASE SHIFTER WITH INTERNAL READOUT

Filed April 12, 1963        2 Sheets-Sheet 1

INVENTOR.
GEORGE V. COLBY Jr.

BY

*Philip J. McFarland*
ATTORNEY

INVENTOR.
GEORGE V. COLBY Jr.
ATTORNEY

United States Patent Office 3,246,241
Patented Apr. 12, 1966

3,246,241
VARIABLE PHASE SHIFTER WITH INTERNAL READOUT
George V. Colby, Jr., Lexington, Mass., assignor to Laboratory for Electronics, Inc., Boston, Mass., a corporation of Delaware
Filed Apr. 12, 1963, Ser. No. 272,628
5 Claims. (Cl. 324—83)

This invention pertains generally to electronic instrumentation and particularly to apparatus for measuring the difference in phase betwen two alternating signals.

Many times in the design of electronic equipment a requirement arises for a means of varying the phase angle of a fixed frequency audio or video signal. There are many well known ways to accomplish this relatively simple function. When, however, the magnitude of the variation in phase angle, or the difference in phase angle between two alternating signals, must also be represented as either a D.C. or an A.C. voltage, the problem of designing proper equipment is very difficult.

One approach that could be used involves using a resolver as the phase shifting element. A resolver, when properly connected and energized, will yield an A.C. signal representative of phase shift in accordance with its shaft rotation. The accuracy of such a phase shift with angle is a fuction of the inherent accuracy of the resolver. Accuracies of the order of 0.1 degree can be achieved in well designed resolvers of known types. The decision to use a resolver, however, involves two distinct difficulties. First, the phase shift can only be linear with angle due to the inherent construction of the resolver. Second, despite the fact that the resolver can shift phase with a high degree of accuracy one still has no means of producing a D.C. signal proportional to phase shaft. A readout device of some type, as a potentiometer mounted on the same shaft as the resolver, is required to convert the A.C. output of the resolver to a D.C. voltage. With such an approach, however, both the linearity of the potentiometer and its alignment with the resolver are critical factors. That is, a high degree of conformity between two precision components must be attained if the desired results are to be had.

Therefore, it is an object of this invention to provide an improved phase sensitive device wherein a substantially linear response to phase variations is produced.

Another object is to provide a phase sensitive device which is adapted to produce a direct voltage indication of the phase relation between two signals.

Still another object is to provide an accurate phase meter which is substantially insensitive to variations in signal amplitude.

In the device according to the present invention, these and other objects are attained through the use of a null balancing system of phase correction which is adapted to provide a linear response to the phase of the signals to be related. Incorporated in this system, is a phase detector to which one of the signals is applied directly. The second signal is first divided into two components which are shifted in phase by equal amounts but in opposite directions. These components are applied to a phase shifting network and a variable phase component of the second signal is combined with the first signal in the phase detector. The output of the phase detector in turn is used to control the operation of a servo motor which produces a 90° phase displacement of the signals at the input of the detector.

To accomplish this latter result, there is coupled to the servo motor as a part of the phase shifting network, a potentiometer which is adapted to produce a substantially linear phase shift as a function of the displacement of its movable element. When a variation in the phase of the signals occurs, an imbalance condition is created and the servo motor operates to change the setting of the potentiometer and thereby produce the required 90° out-of-phase condition to effect a phase null. The amount of phase shift necessary to attain this condition corresponds to the initial phase variation of the signals which created the imbalance.

In order to obtain an indication of the amount of this phase variation a direct voltage is applied to the input of the potentiometer and a direct voltmeter is coupled to its output. By virtue of the substantially linear phase-displacement characteristic of the potentiometer, the magnitude of the voltage applied to the meter likewise varies as a linear function of phase.

Specific ways in which the objects of this invention may be attained will be made apparent by the following description when read in conjunction with the accompanying drawings in which.

Figure 1:
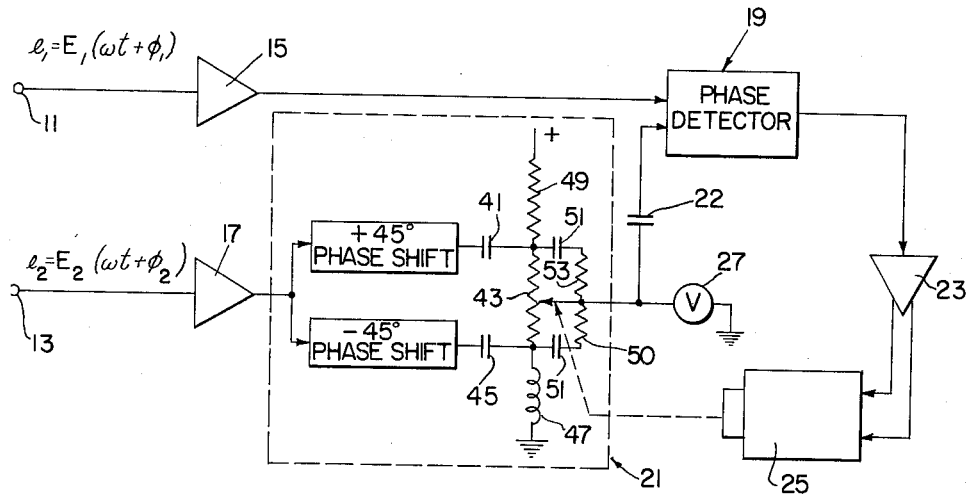
FIG. 1 is a diagram, partially schematic and partially in block form, showing apparatus according to the invention for continuously measuring the phase angle between two signals of the same frequency.

Referring now to FIG. 1 it may be seen that signals whose relative phases are to be measured are led, respectively, to terminals 11, 13. Since it is not material to the invention how input signals are generated, there is no indication given of the source of the input signals. It will be immediately recognized that the indicated signals are sine waves whose descriptive parameters, except frequency, are independent. The frequency of the two input signals is not, however, critical to the invention, since any frequency within a spectrum encompassing audio, video and R.F. frequencies may be used. The input signal introduced to the illustrated apparatus on terminal 11 (hereinafter referred to as the "reference signal") is led to an amplifier 15 and the input signal to terminal 13 (hereinafter referred to as the "variable signal") is led to an amplifier 17. The signal out of the amplifier 15 is led directly to one input terminal of a phase detector 19, while the signal out of the amplifier 17 is led through a variable phase shifter 21 and a coupling capacitor 22 to a second input terminal of the phase detector 19. The output terminal of the phase detector 19 is connected to a D.C. amplifier 23, which in turn controls a servo motor 25. The shaft rotation of the servo motor 25 mechanically controls (as shown by the dotted lines in FIG. 1) the output of the phase shifter 21 in such a manner that the phase of the A.C. signal out of the latter is changed to cause the output of the phase detector 19 to null. The output of the phase shifter 21 is also coupled directly to a D.C. voltmeter 27 to provide a D.C. which is an analog of the phase shift of the signal in the phase shifter 21.

Figure 2:
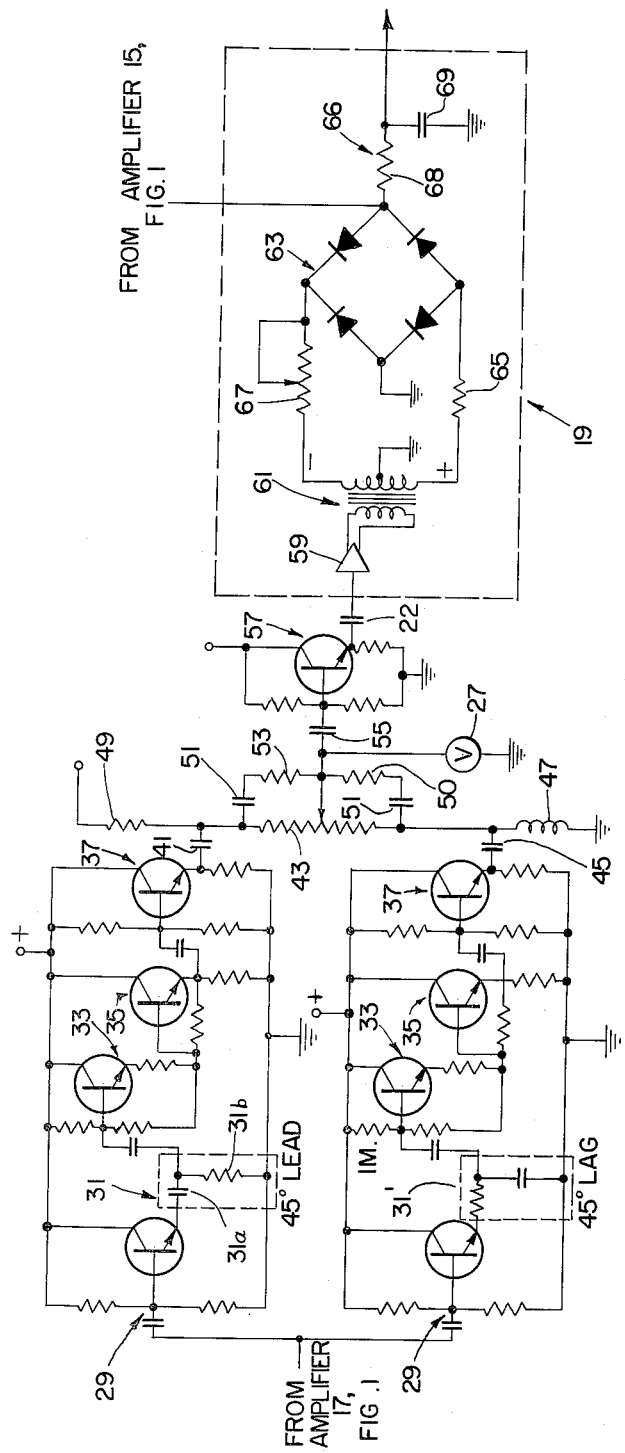
FIG. 2 is a simplified schematic diagram portions of the apparatus shown in FIG. 1.

Referring now to FIG. 2, the constructional details of the phase shifter 21 and the phase detector 19 are clearly shown. Thus, the phase shifter 21 is arranged to accept the output signal of the amplifier 17 and to direct such output signal into two separate paths, designated Channel 1 and Channel 2. Channel 1 comprises an input buffer stage 29 consisting of a transistor and associated biasing resistors, a fixed phase shifter 31 consisting of a capacitor 31a and a resistor 31b arranged as shown to advance the phase of the signal in Channel 1 by 45°, and amplifier stages 33, 35, 37, each consisting of a transistor together with associated biasing resistors. Channel 2 is identical with Channel 1, except that the phase shifter 31', of Channel 2 is arranged to retard the phase of the signal in Channel 2 by 45°. The output of Channel 1 is coupled through a capacitor 41 to one input terminal of a potentiometer 43. The output of Channel 2 is coupled to the second input terminal of the potentiometer 43 through a capacitor 45. Thus, quadrature components of the output signal of the amplifier 17 are applied to the input terminals of the potentiometer 43.

The second terminal of the potentiometer 43 is also connected to ground through a choke coil 47 and the first input terminal of the potentiometer 43 is also connected through an isolating resistor 49 to a source of D.C. potential (not shown). Thus, a D.C. voltage is also applied across the input terminals of the potentiometer 43. A compensating circuit, consisting of a capacitor 51 and a resistor 53 is connected from the first input terminal of the potentiometer 43 to the tap thereof. A similar compensating circuit is connected, from the second input terminal of the potentiometer 43 to the tap thereof. The D.C. voltmeter 27, preferably a known vacuum tube voltmeter, is connected between the tap of the potentiometer 43 and ground.

It is obvious that the amplitude of the D.C. voltage at the tap of the potentiometer 43 varies linearly with the position of such tap. It is also obvious that the phase of the A.C. signal at the tap of the potentiometer 43 is a function of the position of such tap. It follows that, if the D.C. voltage at the tap of the potentiometer 43 and the phase of the A.C. signal at that point are to be correlated, the compensating circuits must be so adjusted that the phase of the A.C. signal at the tap of the potentiometer 43 also varies linearly with the position of such tap. The compensating circuits may be adjusted to accomplish the desired end by evaluating the constant "A" shown in FIG. 3.

Figure 3:
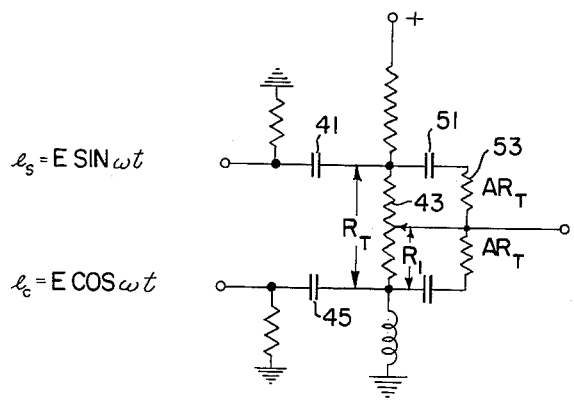
FIG. 3 is a diagram illustrating the principle of operation of the variable phase shifter shown in FIG. 1.

Turning now to FIG. 3 it may be seen that the A.C. output signal at the tap of the potentiometer 43 is due to the vector addition of the quadrature signals derived respectively from Channels 1 and 2. Consequently, as shown in FIG. 3, it may be considered that the A.C. signal at the first input terminal of the potentiometer 43 to be $e_s = E \sin \omega t$ and the A.C. signal at the second input terminal to be $e_c = E \cos \omega t$. The output A.C. signal taken from the tap on the potentiometer will be of the form $e_0 = E_0 \cos(\omega t + \phi)$, where $\phi$ is the phase angle to be varied by adjusting the potentiometer. Since the output signal results from the vectorial sum of the output signals resulting from the two input signals, the phase angle $\phi$ of the output signal is given by: $\phi = \tan^{-1}(e_{0s}/e_{0c})$, where $e_{0s}$ and $e_{0c}$ are the components of the output signal produced by input signals 1 and 2 respectively. If the resistance of the potentiometer 43 is represented by the symbol $R_t$, the A.C. voltage $e_{0s}$, at the tap of the potentiometer 43 (assuming the impedance of the capacitor 51 and the output impedance of amplifier 37 of FIG. 2 to be negligible) resulting from the input voltage, $e_s$, may be expressed as:

$$(1) \quad |e_{0s}| = \frac{\frac{R_1 R_3}{R_1 + R_3}}{\frac{R_1 R_3}{R_1 + R_3} + \frac{R_2 R_3}{R_2 + R_3}} \cdot e_s$$

where $R_2 = R_t - R_1$ and $R_3 = A R_t$, A being a constant.

The A.C. voltage, $e_{0c}$, at the tap of the potentiometer 43 (again assuming the impedance of the capacitor 51 and the output impedance of the amplifier 37 of FIG. 2 to be negligible) resulting from the input voltage $e_c$ may be expressed as:

$$(2) \quad |e_{0c}| = \frac{\frac{R_2 R_3}{R_2 + R_3}}{\frac{R_2 R_3}{R_2 + R_3} + \frac{R_1 R_3}{R_1 + R_3}} \cdot e_c$$

If $R_1/R_t$ is set equal to $x$, Equation 1 divided by Equation 2 may be simplified (assuming the peak amplitude of $e_s$ to be equal to the peak amplitude of $e_c$) as:

$$(3) \quad |e_{0s}| - |e_{0c}| = \tan \phi = [X/1-X][A+1-X/A+X]$$

where $\phi$ is the difference in the phase angle of the output signal from the phase angle of the input voltage $e_c$.

Equation 3 may be rewritten as:

$$(4) \quad \phi = \tan^{-1}[X/1-X][A+1-X/A+X]$$

The D.C. voltage at the tap of potentiometer 43 varies with the quantity $x$ from zero (assuming the resistance of choke coil 47 to be negligible) to a maximum value dependent upon the voltage of the source of D.C. potential (not shown) which energizes the potentiometer 43. At the same time, since the phase angle of the A.C. output signal of the potentiometer 43 obviously will change 90°, as the output tap is moved throughout its range, the D.C. voltage at the tap of potentiometer 43 may be considered to be an analog of the phase shift of the A.C. output signal.

When it is further required that the D.C. voltage be a direct analog of the phase shift of the A.C. output signal then:

$$(5) \quad E_{DC} = \phi = X \cdot \frac{\pi}{2}$$

and the value of the constant A in Equation 4 may be evaluated to any desired degree of accuracy to derive the proper value for the resistors 53. First, inspection of Equations 4 and 5 shows that the two are identical for values of $x$ of 0, ½, and 1. In other words, at such values of $x$, Equation 4 is independent of the constant A. Before going further, it should be noted that errors in the value of the constant A are symmetrical with respect to the point $x=½$. This fact may be shown by evaluating the difference between Equations 4 and 5 for two values of $x$, equidistant from the point $x=½$. This quality of symmetry means that the optimum value of the constant A need be found either for the region $0 \leq x \leq ½$ or for the region $½ \leq x \leq 1$. With the foregoing in mind, the constant A in Equation 4 may be evaluated for small values of $x$. Thus, as $x \rightarrow 0$, $\tan \phi \rightarrow \phi$ and Equation 4 may be simplified to obtain:

$$(6) \quad A = \frac{2}{\pi - 2}$$

The optimum value of the constant A for small values of $x$ is, therefore, 1.752+. Repeating the process for values of $x$ approaching ½, the equation for the optimum value of the constant A as $x \rightarrow ½$ reduces to:

$$(7) \quad A = ½(\pi/4 - \pi)$$

The optimum value of the constant A as $x \rightarrow ½$ is, therefore, 1.829+. Consequently, by selecting a value for the constant A between the extreme values, the "tracking" error (meaning the difference between the A.C. and D.C. outputs of the phase shifter 21) may be kept within sufficiently close tolerances for many practical purposes. For example, for a working phase shifter having a 10,000Ω potentiometer 43, the value 1.8 may be assigned to the constant A so that standard 18,000Ω resistors may be used in the compensating networks.

It will be noted here that, even though the amplitude of the A.C. signal out of the phase shifter 21 may vary somewhat as the position of the tap on potentiometer 43 is changed, variations in output amplitude in the order of 3 db have no effect on the overall accuracy of the apparatus illustrated in FIG. 2. Thus, referring again to the just-mentioned figure, it may be seen that the A.C. signal output at the tap of the phase shifter 21 is coupled through a capacitor 55, an amplifier 57 (consisting of a transistor and associated biasing resistors) and coupling capacitor 22 to an amplifier 59 in the phase detector 19. The output of amplifier 59 is connected, as shown, to the primary winding of a transformer 61 having a grounded center-tapped secondary winding. The high terminals of the secondary winding are connected, respectively, to a diode switching matrix 63 through resistors 65 and 67. The reference signal to be compared with the signal into the phase shifter 21 (the variable signal) is connected to the diode switching matrix 63 as shown and to the input of an integrator 66, here shown as resistor 68 and a capacitor 69.

The phase detector 19 operates in the following manner. The output signal of the amplifier 59 is of the same form (but shifted in phase) as the signal $e_2$ of FIG. 1. With such a signal applied to the transformer 61, the voltage at the high terminals of the secondary winding and across the diode switching matrix 63 varies sinusoidally. During one half cycle of such a variation in voltage (when the voltage at the lower terminal of the transformer 61 is positive with respect to ground) the diodes in the diode switching matrix 63 conduct. Consequently, the input to the integrator 66 is then connected to ground through the diode in the upper right quadrant of the diode switching matrix 63, resistor 67 and the upper portion of the secondary winding of the transformer 61. Conversely, when the diode switching matrix 63 is open-circuited (due to reversal of the polarity of the signal input to the transformer 61), the reference signal is impressed on the input of the integrator 66. A moment's thought will make it clear that the amplitude and sense of the output of the integrator 66 will depend only on the amplitude of the reference signal and the phase difference between such signal and the signal impressed on the diode switching matrix 63. That is, the signal output of the integrator 66 will vary from a positive maximum when the two signals are in phase, to zero when the two are in quadrature, and, finally, to a negative maximum when the two are exactly out of phase. The maximum values of the output of the integrator 66 and the shape of its output characteristic curve are, of course, dependent upon the amplitude and shape of the reference signal and of the response characteristic of the integrator 66 to such reference signal. The amplitude of the signal impressed on the diode switching matrix 63 need only be large enough to cause the diodes therein to switch from their conducting to non-conducting state.

In the embodiment of the invention illustrated in FIG. 1, where the output of the phase detector 19 (which is the output of the integrator 66 of FIG. 2) is the actuating signal for the D.C. amplifier 23, even the amplitude and shape of the reference signal is of secondary importance. This is so since the D.C. amplifier 23 in turn controls the servo motor 25 to drive the tap on the potentiometer in the phase shifter 21 to such a position that the output of the phase detector 19 is at its proper null.

It will be immediately apparent to those having skill in the art that two nulls would be encountered as the difference in phase between the two input signals, $e_1$, $e_2$ is changed from 0° to 360°. The "error" signal to the servo motor 25 will, however, be such that stable operation will be possible at only one of the nulls. It will also be apparent to those having skill in the art that, as illustrated, the apparatus shown in FIG. 1 may attain a stable condition only when the difference between the phase angle of the first input voltage $e_1$ and the phase angle of the second input voltage $e_2$ is between 45° and 135°. If, however, other ranges of phase differences are to be measured it is evident that provision may easily be made to bring the difference in phase of the signals into the phase detector 19 within the 45° to 125° range. That is, known fixed phase shifters may be inserted in either or both input lines to bring the signals applied to the phase detector 19 within the desired range. For example, the amplifiers 15, 17 could be arranged to invert either of the input signals if a 180° phase shift is required; or known 90° phase shifters could be inserted in either of the input lines to shift the input signals. Obviously, then, the amount of the added phase shift would be added to the reading on the voltmeter 27 to derive the actual phase difference between the input signals.

The foregoing description of a preferred embodiment of this invention demonstrates many of the advantages to be derived from its use in a practical measuring system. The fact that both an A.C. or a D.C. signal indicating phase difference between two A.C. signals is derived makes this invention of particular value in its field. Further, since the disclosed circuit is independent (within a very broad spectrum of frequencies) of the frequency of the input signals to be measured and may be fabricated entirely from standard elements, its utility is greatly enhanced.

Many modifications of the illustrated embodiment of this invention will be immediately apparent to those having skill in the art. Thus, it will be apparent that, so long as the compensating circuit for the potentiometer is properly designed and the A.C. voltages applied to it are in quadrature, the objects of the invention will be attained. This means that the designer of apparatus according to this invention may adapt the disclosed structure as he desires to the particular signals he is measuring. It is felt, therefore, that the invention should not be limited to the embodiment disclosed herein, but rather should be limited only by the spirit and scope of the appended claims.

What is claimed is:
1. A phase indicator comprising:
 (a) a phase detector to provide a voltage as a function of the phase relation between a pair of signals;
 (b) a phase splitter to provide quadrature phase components of a first of said signals;
 (c) a potentiometer having a pair of fixed terminals and a movable terminal, said quadrature phase components being applied between the respective fixed terminals of said potentiometer and a common terminal to develop a variable phase component of said first signal between said movable terminal and said common terminal;
 (d) a series circuit formed with a capacitive element and a resistive element serially connected between each of the respective fixed terminals and the movable terminal of said potentiometer to improve the linearity of the relation between the phase of said variable phase component and the displacement of the movable terminal of said potentiometer;
 (e) means to apply the second signal and said variable phase component of the first signal to said phase detector;
 (f) a servo motor to produce mechanical displacement of the movable terminal of said potentiometer in response to the voltage developed by said phase detector;
 (g) a source of direct voltage of fixed magnitude coupled to the fixed terminals of said potentiometer; and
 (h) indicator means coupled between the movable terminal and one of the fixed terminals of said potentiometer to provide an indication that represents the phase displacement of said signals.

2. A phase shifting device with internal readout comprising:
 (a) a potentiometer having a pair of fixed terminals and a moveable terminal,
 (b) means to apply a variable input signal to a phase splitting means, said phase splitting means responsive to said variable input signal to provide a pair of signal components substantially in phase quadrature to said pair of fixed terminals,
 (c) means to vary the position of said moveable terminal so as to produce an output signal shifted in phase with respect to said variable input signal,
 (d) a D.C. voltage connected to said potentiometer,
 (e) and circuit means connected between said moveable terminal and one of said fixed terminals to provide an indication of the magnitude of phase shift produced.

3. A device as claimed in claim 2 comprising in addition impedance elements connected between said fixed terminals and said moveable terminal so as to provide a linear phase shift of said variable input signal as a function of the position of said moveable terminal in accordance with the expression.

$$\tan \theta = \frac{X}{1-X}[A+1-X/A+X]$$

where $\theta$ is the phase of the output signal, X is the fractional position of the moveable arm on the potentiometer and A is a constant.

4. A device as claimed in claim 2 comprising in addition a series resistance capacitance network connected between each said fixed terminals and said moveable terminal so as to produce a substantial linear relationship between the phase of the output signal and the variance in position of the moveable terminal.

5. A device for shifting the phase of an input signal and measuring the phase of the resultant output signal comprising:
(a) a single voltage dividing means having a tap thereon,
(b) means to apply phase quadrature components of said input signal to said single voltage dividing means so as to develop an output signal at said tap shifted in phase with respect to said input signal,
(c) a source of D.C. voltage across said voltage dividing means,
(d) and circuit means including said tap to derive from said voltage dividing means a D.C. signal which is a substantially linear function of the phase of said output signal.

References Cited by the Examiner

UNITED STATES PATENTS 3,019,390   1/1962   MacMillan _____ 324—89
3,022,459   2/1962   Alper _____ 324—83

WALTER L. CARLSON, *Primary Examiner.*

FREDERICK M. STRADER, *Examiner.*

P. F. WILLE, *Assistant Examiner.*